United States Patent [19]

Gunnerman

[11] 3,944,685

[45] Mar. 16, 1976

[54] PREPARATION OF HEAT BARRIER MATERIALS

[75] Inventor: Rudy W. Gunnerman, Beverly Hills, Calif.

[73] Assignee: Plastonium, Inc., Irvine, Calif.

[22] Filed: June 28, 1971

[21] Appl. No.: 157,732

Related U.S. Application Data

[60] Continuation-in-part of Ser. No. 763,931, Sept. 30, 1968, abandoned, which is a division of Ser. No. 713,231, March 14, 1968, abandoned.

[52] U.S. Cl. ................... 427/223; 264/29; 264/80; 423/170; 423/511; 423/561; 427/224; 427/228; 427/399

[51] Int. Cl.$^2$ .......................................... B05D 3/08

[58] Field of Search ....... 117/46 CB, 46 CC, 46 FC, 117/46 FS, 118, 137, 46 CA, 46 F, 46 A, 138; 260/2.5 B, 29, 44, 60, 61, 80, 122; 23/134, 137; 264/29, 80; 252/8.1, 62; 106/15 FP; 423/511, 561, 170; 427/223, 228, 224, 399, 511, 561, 170

[56] References Cited

UNITED STATES PATENTS

| | | | |
|---|---|---|---|
| 97,079 | 11/1969 | Greely | 252/62 |
| 865,033 | 9/1907 | Haley | 117/138 |
| 1,045,769 | 11/1912 | Bollo et al. | 23/137 |
| 1,457,436 | 6/1923 | Howard et al. | 23/137 |
| 1,492,810 | 5/1924 | Rossberg et al. | 23/137 |
| 1,565,300 | 12/1925 | White | 23/137 |
| 1,636,106 | 7/1927 | Naef | 23/137 |
| 1,648,870 | 11/1927 | Richardson | 23/137 |
| 1,685,772 | 10/1928 | Booge et al. | 23/137 |
| 1,829,188 | 10/1931 | Rüsberg | 23/137 |
| 2,797,201 | 6/1957 | Veatch et al. | 260/2.5 B |
| 3,061,468 | 10/1962 | Tryon | 117/138 |
| 3,104,196 | 9/1963 | Shannon | 260/2.5 B |
| 3,214,393 | 10/1965 | Sefton | 260/2.5 B |
| 3,257,338 | 6/1966 | Sefton | 260/2.5 B |
| 3,272,765 | 9/1966 | Sefton | 260/2.5 B |
| 3,462,289 | 8/1969 | Rohl et al. | 117/46 CB |
| 3,591,393 | 7/1971 | Rankine | 252/62 |

*Primary Examiner*—Ralph Husack
*Assistant Examiner*—Janyce A. Bell
*Attorney, Agent, or Firm*—Lyon & Lyon

[57] ABSTRACT

Heat barrier materials are prepared by forming an intimate admixture of alkaline earth sulfate and finely divided carbonaceous material into a shaped composition and subjecting said shaped composition to a high temperature to cause a surface reaction to produce a coating comprising alkaline earth sulfide on the surface of said shaped composition.

12 Claims, No Drawings

PREPARATION OF HEAT BARRIER MATERIALS

This application is a continuation-in-part of my application filed Sept. 30, 1968, Ser. No. 763,931, now abandoned which is, in turn, a continuation-in-part of my application filed Mar. 14, 1968, Ser. No. 713,231, now abandoned.

It is an object of this invention to provide a method of forming alkaline earth sulfides in position upon the surface of a shaped composition to form a barrier to the penetration of thermal energy into such a composition upon the continued application of energy producing high temperature to the surface thereof.

It is a further object of this invention to provide a method of forming alkaline earth sulfides by the direct reduction of alkaline earth sulfates through the application of a high temperature atmosphere to a bonded intimate mixture of the alkaline earth sulfates and carbonaceous material.

It is a further object of this invention to produce a method of producing at the surface of an alkaline earth sulfate composition an alkaline earth sulfide coating through the reduction of the alkaline earth sulfate with available carbon to form sulfides in situ as a heat barrier.

It is a further object of this invention to provide a method of forming alkaline earth sulfides by the direct reduction of alkaline earth sulfate hydrates by intimately mixing in said hydrates thermosetting and/or elastomeric carbon-containing plastics and the application thereto of atmospheres of high temperature so that the sulfates are reduced to the sulfides at approximately the thermal decomposition temperature of the plastics.

It is a further object of this invention to provide a method of forming alkaline earth sulfides by the reduction of alkaline earth sulfates through the heating of the alkaline earth sulfates and carbon-containing thermosetting plastics in intimate contact and at the thermal decomposition temperature of the said plastics wherein a slow reducing reaction is performed resulting in the formation upon the surface of the material a relatively thin coating of the sulfide which restricts the transmission of thermal energy through the material and in which the rate of formation of the sulfide is slow, resulting in a low rate of erosion of the surface of the material.

The art of which I have knowledge is that appearing in the book entitled "High-Temperature Technology", Editor-in-Chief I. E. Campbell, published by John Wiley & Sons, New York, Chapter 9 thereof entitled "Sulfides", and the patent to Veatch U.S. Pat. No. 2,797,201.

There has long been sought a preparation or composition which would be effective as a heat barrier to prevent transmission of thermal energy from one surface to another and which, for example, might be effectively used under conditions where high velocity, high temperature gas flames or the like are applied to a surface and which would be effective to prevent the thermal energy so transmitted to said surface from being transmitted through the said material.

I have discovered that an effective heat barrier can be produced in situ upon the surface of a composition consisting essentially of an intimate admixture of alkaline earth sulfate and finely divided carbonaceous material. Upon application of heat to a surface of such a composition, the alkaline earth sulfate and carbon react, primarily at the surface of the composition, whereby the sulfate is reduced to sulfide to provide an effective thermal barrier on such surface.

In one embodiment of my invention, the compositions may be formed by using calcined alkaline earth sulfates, i.e., those sulfates which are not fully hydrated. The sulfates may be mixed with water to form a slurry to which carbonaceous material in the condition of fine subdivision is added and thoroughly admixed. The mixture is allowed to set due to hydration of the alkaline earth sulfates so that there is formed a composition in which the alkaline earth sulfate crystals form a matrix in which the particles of finely divided carbonaceous material are held in intimate mixture therewith. The composition, before setting, can be formed into sheets or blocks or can be applied directly to the surface to be protected from heat. When high temperature is applied thereto, there results the formation upon the surface of an alkaline earth sulfide due to the reduction of the sulfate to the sulfide by the carbon which is available at such surface. However, the invention is not limited to use of those sulfates which form hydrates nor to those which set by taking up water of crystallization. It is merely necessary that the admixture of alkaline earth sulfate and carbonaceous material be formed or held in some manner in a desired shape which may be subjected to high temperature conditions.

The term "high temperature" as used herein means a temperature at least as great as that at which the sulfates react with the intimately associated carbon to form sulfides. It is believed that this temperature is in the order of about 900°C.

The alkaline earth sulfates which are applicable for use in carrying out my invention include magnesium sulfate, calcium sulfate, strontium sulfate, barium sulfate, and all of the alkaline earth sulfates of Perioidic Table 2-A as well as mixtures of any of these sulfates.

The carbonaceous materials which are useful for carrying out my invention include all materials which will provide available carbon under the influence of sufficient heat to effect the reaction of carbon with sulfates according to the representative equation:

$$MSO_4 + 2C \rightarrow MS + 2CO_2$$

where M is an alkaline earth metal.

These materials include all forms of free carbon, such as carbon black, charcoal, coke, and graphite as well as those materials which will decompose, coke or char under the influence of heat to produce available carbon. The latter materials include carbonaceous materials of natural origin, such as coal, tars, pitches, asphalts, sawdust, nutshells, and other wood or vegetable wastes, natural rubber, gums and resins and materials of synthetic origin including substantially all of the carbon-containing synthetic resins. The carbonaceous materials may be employed in the form of particles which are already of small size or which have been reduced in size by comminuting or by process of manufacture. Mixtures of the various carbonaceous materials may be used as desired. One class of suitable materials is that known under the trademark "Microballoons" as disclosed in U.S. Pat. No. 2,797,201. The carbonaceous material may be any of the heat-decomposable film-forming materials disclosed in this patent including cellulose derivatives, such as cellulose acetate, cellulose acetate-butyrate, and cellulose acetate-propionate, thermoplastic synthetic resins, such as polyvinyl resins, i.e., polyvinyl alcohol (water- or organic solvent-soluble), polyvinyl chloride, copolymers of vinyl chloride and vinyl acetate, polyvinyl butyral, polystyrene, polyvinylidene chloride, acrylic resins such as polymethyl methacrylate, polyallyl, polyethylene, and polyamide (nylon) resins, and thermosetting resins, such as alkyd, phenol-formaldehyde, urea-formaldehyde and melamine-formaldehyde resins, natural film-forming materials including soybean protein, zein protein, alginates, and cellulose.

It is important that the carbonaceous material be finely divided in order that it may be intimately dispersed in the alkaline earth sulfate so that carbon is available at substantially all points over the surface area of product composition, whereupon application of heat to such surface will provide a substantially complete coating of alkaline earth sulfide over such surface with exclusion of uncoated portions which might otherwise destroy the effectiveness of the product material as a heat barrier. In general, the carbonaceous material should have a maximum average particle size below about 500 microns and, in particular, where hollow spheres of film-forming materials are used the particle size should be below about 500 microns not only to provide the necessary available carbon over the entire surface area but to avoid formation of surface irregularities and holes due to melting or collapsing of the spheres under the influence of heat. Thus, where "Microballoons" such as those described in U.S. Pat. No. 2,797,201 are used as a source of carbonaceous material, they should have an average diameter of about 1 to 500 microns, preferably 1 to 250 microns.

The proportions of carbonaceous material to alkaline earth sulfate may be varied depending upon the conditions of application or use desired, the nature of the particular carbonaceous material used, the strength and/or flexibility of the desired product, and the like. The optimum amount of each carbonaceous material necessary to give the desired sulfide coating is readily determined by simple experimentation. In general, the amount of carbonaceous material should be sufficient to provide at least 2 moles of carbon for each mole of alkaline earth sulfate (on an anhydrous basis). I prefer to use about 0.02 to 5 parts by volume of carbonaceous material to 1 part by volume of alkaline earth metal sulfate.

The application of heat to the surface of my heat barrier materials may be from any source which will provide a temperature sufficient to cause the reaction between the alkaline earth sulfate and carbon. For example, the heat may be convective (such as a flame or hot gases); radiative (infrared, laser beam, etc.) or conductive (contact with a hot object) or combinations of these. Flames of reducing, neutral or oxidizing nature will cause the reaction to occur. The reaction between sulfate and carbon is believed to occur at a temperature of about 900°C. Continued heating at higher temperatures may cause some reaction between alkaline earth sulfide and sulfate to form alkaline earth oxide. However, the presence of some oxide in the sulfide surface coating is beneficial and is considered within the scope of my invention.

Where organic material other than free carbon is used, my theory of the operation performed under the conditions stated is that the carbonaceous material chars at its temperature of decomposition leaving primarily carbon in intimate mixture with the sulfate. Ordinarily the water of crystallization of hydrated sulfates is dissipated before or at the decomposition temperature of the carbonaceous material. Upon decomposition and further application of heat the carbon acts as a reducing agent to reduce the alkaline earth sulfate to the sulfide as a surface condition upon the composition. This formation of alkaline earth sulfides on the surface is as a relatively thin coating which appears, under the influence of the heat conditions above set forth, to be in the nature of a layer which is adherent to the composition and acts either by heat-producing energy reflection or dispersion as a barrier which reduces to a high degree the transmission of the heat further into the material or composition. The surface condition having been formed, further heat transmission into the composition is inhibited so that further charring of the carbonaceous material is slowed down as is further reduction of sulfate to sulfide.

I have further discovered that I am able to control the flexibility of the composition of my invention by adding to the composition of alkaline earth sulfates, elastomeric carbonaceous materials such as vinyl, styrene, acrylic, cellulosic, olefinic, and nylon polymers and copolymers or other elastomers, so that I am able to produce a flexible composition as distinguished from a hard inflexible material without interfering with the fundamental property of forming the sulfide upon the surface thereon under conditions of heat application as hereinabove set forth. Thermoplastics such as the polyvinyl alcohols and polyvinyl acetates may be dissolved or suspended in the water or other liquid used to form the alkaline earth sulfate composition. Mixtures of the various carbonaceous materials, both thermosetting and elastomeric, may be used. The formation of the composition having flexible as distinguished from rigid characteristics enables the composition to be used and applied under conditions where rigidity of the composition would deter its application. It is not necessary to use alkaline earth sulfates which form hydrates nor is it necessary to use water as a bonding agent in this embodiment of my invention. For example, $BaSO_4$, which does not form hydrates, may be mixed with acrylic polymer or with other elastomers dissolved in an organic liquid to form a paste which can then be formed into any desired shape. The organic liquid can then be evaporated to leave the elastomer in intimate admixture with the sulfate.

I have further found that in the preparation of the composition embodying my invention that I am able to produce the composition in such manner as to avoid the formation of cracks or fissures in the material upon the conditions of application of high temperature to its surface as hereinabove defined by incorporating in the composition formed of the alkali earth sulfates and carbonaceous material a strain or grid of fiberglas or other fibrous material, e.g. rockwood, asbestos, sisal and the like, either at the surface or embedded in the composition as it is formed.

In carrying out one embodiment of my invention I prepare a slurry of any of the hydratable forms of the alkaline earth sulfates with water and mix decomposable carbonaceous material in fine particle size into this slurry. The resulting composition will set due to the sulfates taking up of water of crystallization to form a rigid or semi-rigid structure. After the composition has set and there is applied to a surface thereof a high temperature atmosphere the reaction is first to drive off water crystallization. As the surface temperature rises and reaches the thermal decomposition temperature of the carbonaceous material the reaction performed is apparently to release carbon in active form in intimate contact with the sulfate which reduces the sulfate to the sulfide forming a relatively thin layer or coating of sulfide upon the surface which is adherent to the composition, relatively thin, and performs the functions of restricting further transmission of heat into the composition so that the reaction of decomposition of the carbonaceous material is slow and therefore the erosion of the surface is controlled.

For example, I have discovered that I am able to reduce directly the alkaline earth sulfates to the alkaline earth sulfides principally through the action of the active carbon constituents of a thermosetting plastic releasing carbon dioxide, and that such reaction proceeds at a relatively slow rate due to the formation upon the surface of the composition an alkaline earth sulfide as an adherent film or layer which inhibits the transmission of heat into the composition to prevent further decomposition of the thermosetting plastic, i.e., controls erosion of the product and the rate of the reaction performed.

The reaction produced in employing calcium sulfate crystals and the thermosetting plastic phenolic resin may be in accordance with the following equation:

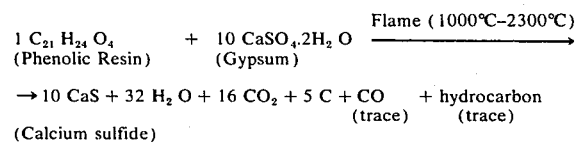

The reaction above stated in indicating the presence of a trace of carbon monoxide and a trace of hydrocarbons was derived from gas analysis of the gases from the surface of the composition where the temperature upon the surface was as stated.

In the above equation I have not endeavored to fully balance the equation because of the fact that gas analysis of the gas formed upon that surface will show variable quantities of the respective gases produced dependent upon the time when the gas samples were taken from the surface. Fundamentally these same reactions occur in employing the hydratable sulfates of other alkaline earth metals of Group 2-A of the Periodic Table and with phenolic resin or other plastics, and would logically follow with reference to radium sulfate although due to the expense and my inability to obtain samples of radium sulfate I have not actually been able to establish that radium sulfate would in all respect act in the same manner as the other members of the No. 2-A grouping of the Periodic Table. The invention is not limited to hydratable sulfates. Water or other liquid bonding agents may be used with sulfates which do not form hydrates.

It is recognized that it has heretofore been suggested that the sulfates are susceptible to direct reduction with carbonaceous materials to form sulfides. However, the novelty of my invention is believed to reside in the formation of the sulfides in such a manner that they form a thin layer or coating upon the surface of a shaped composition in such condition that they are adherent to the composition under the continued application of high temperature conditions to the surface and act as a barrier to heat transmission through the surface, thereby controlling the rate of erosion of the surface and at the same time and due to the same conditions control the rate at which the reaction progresses in the composition.

Further, one embodiment of my invention resides in the use of organic plastics in such composition wherein at the thermal decomposition temperature of such plastic the carbon resulting acts as the primary reducing agent and in that this rate of thermal decomposition of the organic plastic is retarded by the heat barrier characteristics of the thin layer of sulfide bonded upon the surface of the composition.

I believe, although I have not been definitely able to thoroughly establish the fact, that the action of reducing the alkaline earth sulfates to the corresponding sulfides occurs at what is commonly referred to as the thermal decomposition temperature of the organic material, i.e., that temperature at which the organic materials ordinarily decompose rather than melt or boil. I further believe, although I have not been able to thoroughly establish the fact, that the reaction occurring is primarily one due to the high availability of reactive carbon derived from the said organic sources, which is maintained in intimate contact with sulfate in this reaction so that one of the products of the reducing action is carbon dioxide.

In carrying out this embodiment of my invention I have found that I may employ any organic material which possesses the property of heat decomposition at elevated temperature. Among the thermosetting plastics which I may employ are the phenolic resins, urea formaldehydes, and melamine formaldehydes. The above specific plastics are set forth as examples only and not as limitations of the plastics which may be used, the necessary factor of which is that upon application of heat thereto the plastics decompose to provide carbon in intimate contact with the sulfate to carry out the reduction reaction.

I have further observed that it is apparently characteristic of my invention that the primary reducing action accomplished at the controlled rate as herein stated is due to the presence of finely divided carbon within the composition.

It is therefore my belief that fundamentally the reaction which occurs is represented by the following equation using calcium sulfate dihydrate as an example:

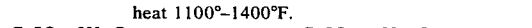
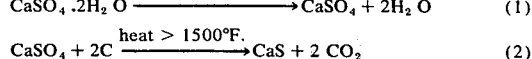

wherein, however, the reducing reaction when carried out with such thermosetting plastics as phenolic resin is such that there may be present as products of reaction due to imperfect reduction in addition to carbon dioxide, carbon monoxide and water, and I have observed in small quantities in such gas analysis the presence of hydrocarbons.

The ability of such alkaline earth sulfide to coat the surface of the composition formed of the alkaline earth sulfates and thermosetting plastics is established from the fact that I have found high temperature atmospheres such as produced by the plasma jet flames directly applied to such surfaces have produced a thin calcium sulfide coating upon the surface on continued application of such high temperature atmosphere to the surface for 24 seconds where the temperature of the gas flame applied upon such surface was in the range of 10,000°F. which has raised the temperature at the surface to which such high temperature atmosphere was applied to in the neighborhood of 4500° to 5000°F. and where at the termination of said application of heat after 24 seconds to said surface, and where the composition was only ½ inch in thickness the back surface at which the high temperature atmosphere was applied had reached only the temperature of 140°F. I account for this phenomena solely by what I will term heat rejection which in all probability is due to reflection or dispersion of the thermal energy away from the composition so that they do not effectively penetrate the composition. This phenomena is a surface phenomena in that during this period of time the total erosion of the surface, i.e., due to the formation of the calcium sulfide thereon is 0.199 inch showing that the alkaline earth sulfide formed upon the surface not only acts as a heat barrier but also an erosion barrier. At lower temperatures such as those resulting from the direct application of an acetylene-oxygen flame to the surface results of a similar character have been found. The same is true where the surfaces have been exposed to the temperature created by the burning of propane gas, the flames of which are applied directly to the surface while the burners in which said flames are formed have been located at distances of 12 or more inches away from the surface. In the latter case reducing flames so applied were at a temperature in the neighborhood of 2000°F.

It has been found that when the composition having the said alkaline earth sulfide barrier formed upon its surface is allowed to cool in the ordinary atmosphere the adherent alkaline earth sulfide coating disintegrates rapidly, apparently due to the reaction of the alkaline earth sulfide with water contained in the air, producing primarily alkaline earth hydroxide. Upon removal of this now powdery material from the surface the same composition may be reused with the same results, i.e., the formation of the coating of alkaline earth sulfide upon the surface exhibiting the same heat retardant and erosion barrier characteristics. The following are set forth as specific examples of the composition embodying my invention and of the test results observed.

EXAMPLE I

Calcium sulfate, i.e., calcium sulfate hemihydrate ($CaSO_4.½ H_2O$) is mixed with water to form a slurry using the same proportions of calcium sulfate hemihydrate and water as is ordinarily used in forming a slurry for casting purposes. The slurry thus formed is allowed to stand for such period of time as will permit the addition thereto of phenolic resin either in finely ground condition or as microballoons without the tendency of the said phenolic resin to separate during the subsequent setting, which thereby forms a matrix holding the phenolic resin intimately dispersed with the calcium sulfate throughout the composition. In this composition I employ in this specific example 30% by volume of $CaSO_4.½ H_2O$ and 70% by volume of finely divided phenolic resin of 500 micron maximum average particle size and the amount of water added to form the slurry is in accordance with good practice that amount which will permit the formation of a thick cream slurry, i.e., in most cases employing the minimum of water which will permit the formation of a uniform intimate mixture of the $CaSO_4.½ H_2O$ and phenolic resin. The ratio of $CaSO_4.½ H_2O$, phenolic resin and water employed in forming the composition may, of course, be varied depending upon the conditions of application or use desired and is not herein set forth as a limitation of the proportions of ingredients used in carrying out my invention.

I have similarly prepared compositions employing magnesium sulfate, strontium sulfate, and barium sulfate, and phenolic resin, and others of the carbonaceous plastics.

EXAMPLE II

In producing the composition embodying my invention so that it will have flexibility as distinguished from rigid compositions produced by the above set forth example, I have in a similar manner produced the slurry of the alkaline earth sulfate and water and thermosetting plastic and have added thereto a suspension of thermoplastic material and have found that the composition thereby produced is flexible as distinguished from a rigid composition. Specifically, I have mixed 100 parts by volume of $CaSO_4.½ H_2O$, sufficient water to form the slurry as above described, to which I have added 200 parts by volume of phenolic resin, and 100 parts by volume of the approximately 50% suspension of polyvinyl acetate in water and have found that upon setting, the resultant composition was flexible as distinguished from the rigid composition produced by the first stated example. The operation apparently performed in this example is that the addition of the vinyl plastics to the composition in excess of that set forth in the first example given has prevented the complete interlock of the crystals of the alkaline earth sulfate, leaving the composition flexible.

HEAT-BARRIER TESTS

A test block of the composition was prepared in the manner hereinabove set forth in Example I in which proportions were 70% by volume of phenolic resin microballoons (max. average particle size 500 microns) to 30% by volume of $CaSO_4.½ H_2O$ with water which was allowed to set to form test blocks which were 2 × 2 inches square and of ½ inch thickness. An arc plasma jet flame was applied to the surface of such block under the following conditions:

| | |
|---|---|
| Heat Flux ($Btu/ft^2$ - second | 1000 |
| Gas Enthalpy (Btu/lb) | 6050 |
| Test Duration in seconds | 24 |
| Stagnation Pressure (psig) | 1.242 |
| Gas Velocity (ft/second) | 10025 |
| with the following results: | |
| Decrease in weight (grams) | 4.7874 |
| Percentage decrease in weight | 3.4 |
| Depth of erosion in inches in the surface so exposed | 0.199 |
| Final temperature in °F. | |
| (a) Back Face | 140 |
| (b) Front Face | 4820 |
| (c) Front Face (Total Radiation) | 4340 |

Further tests were conducted in blocks of the same composition to determine the rate of erosion of the surface with the following results:

| Specimen | Heat Flux ($Btu/ft^2$ sec) | Test Time (sec) | Erosion Rate (mil/sec) |
|---|---|---|---|
| A | 100 | 137 | 3.27 |
| B | 500 | 24 | 3.96 |
| C | 500 | 44 | 7.70 |
| D | 1000 | 24 | 8.30 |

Further tests were conducted employing larger sheets of the same composition of like thickness which were tested in an oven over propane gas burners which were spaced 18 inches on center and where the burners were placed 30 inches from the face of the test panel. Propane gas was burned in the burners under the conditions hereinafter set forth. The temperatures at the face of the panel, toward which the flames were directed were measured by means of eight Chromel-Alumel thermocouples encased in ½ inch iron pipe and placed approximately 6 inches from the panel face. The vertical and lateral placement of the thermocouples was determined by experimentation and visual observation of the flow pattern of the burning gases. Thermocouple leads were connected through a rotary switch to a Techniques Associates Pyrotemp Model 9-B pyrometer from which temperature readings were obtained manually. The backside temperatures were taken by placing seven ironconstantan thermocouples on the cross framing of the panel and with one thermocouple placed directly on the back surface of the composition. The following temperature readings in degrees Fahrenheit were taken from the panel face:

| Minutes | Temperature Readings, Degrees F. Panel Face Station No. | | | | | | | | Required Temp. |
|---|---|---|---|---|---|---|---|---|---|
| | 1 | 2 | 3 | 4 | 5 | 6 | 7 | 8 | |
| 2 | 250 | 200 | 164 | 164 | 204 | 174 | 115 | 158 | — |
| 5 | 490 | — | — | — | — | — | — | — | 1000 |
| 7 | 760 | 605 | 334 | 273 | 630 | 555 | 300 | 280 | 1150 |
| 12 | 1020 | 870 | 590 | — | — | — | — | — | 1340 |

The pressure of the gas flowing to the burners at the start of the test was 5 pounds per square inch which was increased to 10 pounds per square inch after 5 minutes at which gas pressure the test was continued for the full duration of 12 minutes.

The temperatures at the back of the panel measured by the thermocouples as above described were as shown by the following table:

| | Temperature Readings, Degrees F. Panel Back | |
|---|---|---|
| Minutes | Min. | Max. |
| 0 | 87 | 102 |
| 2 | 87 | 102 |
| 4 | 90 | 103 |
| 6 | 90 | 110 |
| 8 | 87 | 109 |
| 10 | 92 | 112 |
| 12 | 92 | 113 |
| 14 | 93 | 124 |
| 16 | 94 | 126 |
| 18 | 76 | 108 |

Further tests utilizing substantially the same equipment and test samples of the same character have been conducted wherein for a total elapsed time of 2 hours and 15 minutes the average surface temperatures taken over the hot side surface have been in excess of 1900°F. and the temperature of the back face taken likewise over the distributed points as hereinabove indicated has been less than 180°F.

EXAMPLE III

The following materials were mixed and cast into sheet form which upon setting provided a material of excellent fire resistance, a sulfide surface coating being formed upon exposure to high temperature environment.

| | |
|---|---|
| $CaSO_4 \cdot \frac{1}{2} H_2O$ | 1800 gms. |
| Pulverized anthracite coal (−200 mesh) | 450 gms. |
| Glass fibers (approx. 1") | 39.6 gms. |
| Liquid phase | 900 gms. |

The liquid phase was a solution of 5 ounces of polyvinyl acetate emulsion in 3 quarts of water.

Other forms of carbon, such as carbon black, pulverized charcoal and finely divided graphite may be substituted for coal in the above formula. The glass fibers and polyvinyl acetate may be omitted if high strength and flexibility is not necessary for the particular use. Other sulfates, such as barium sulfate, may be substituted for part or all of the calcium sulfate. Other polymers may be included as solutions or dispersions in the liquid phase to impart the special characteristics of these polymers. It will be understood that emulsifiers and disperants as well as anti-foaming agents may be included as desired.

PARTICLE SIZE

In order to illustrate the importance of particle size of carbonaceous materials the following samples were prepared and tested:

| Sample No. | Organic Additive | Approx. Max. Particle Size (microns) | Vol. Ratio $CaSO_4 \cdot \frac{1}{2}H_2O$ to Organic |
|---|---|---|---|
| 1 | Ground Nut Shells | 74 | 1:1 |
| 2 | Ground Nut Shells | 74 | 2:1 |
| 3 | Phenolic Microballoons | 500 | 1:1 |
| 4 | Phenolic Microballoons | 500 | 2:1 |
| 5 | Ground Polyurethane | 1000 | 2:1 |
| 6 | Polystyrene beads (expanded) | 7000 | 2:1 |
| 7 | Polystyrene beads (expanded) | 2000 | 2:1 |
| 8 | None | — | — |

These materials were mixed with water and cast into 3 × 3 × 1 inch test samples. After the samples had set they were subjected to a flame provided by an oxy-acetylene torch. The tip of the torch was approximately 5 inches from the sample surface and the torch was adjusted to provide a slight excess of oxygen. The condition and brightness of the surface of the material during the test was recorded photographically. Sample 8, which contained no carbonaceous additive, was taken as the control sample.

The samples containing the larger size particles exhibited severe surface erosion when exposed to the flame. The surface brightness of the control sample 8 was given a value of 1 and the relative brightness of the surface of the other samples was measured against this control value. Samples 1 and 2 had a relative surface brightness of about 32 and 64, respectively, representing a high surface reflectivity due to the formation of a uniform sulfide and/or oxide coating on the surface. Sample 5 showed substantially no increase in surface brightness over the control and samples 6 and 7 had a relative surface brightness of about 2. The relative surface brightness of samples 3 and 4 was intermediate between that of samples 6 and 7 and sample 1. On the basis of these tests I conclude that the maximum average particle size of carbonaceous material which will provide beneficial results pursuant to the present invention is about 500 microns. Samples 1–4 are representative examples within the scope of the invention. Samples 5 through 7 do not constitute representative examples of the invention. The materials of these samples may be usefully employed where the average particle sizes are reduced to no greater than about 500 microns.

Having fully described my invention it is to be understood that my invention is not limited to the details herein set forth but is of the scope of the appended claims.

I claim:

1. The method of forming a heat barrier which includes applying to a surface of a shaped intimate admixture of alkaline earth sulfate and thermosetting plastic of reduced particle size, a heat source to produce an adherent alkaline earth sulfide layer upon said surface to thereby form a a heat barrier coating resistant to the penetration of thermal energy into the body of said admixture, and using said admixture as a heat barrier material.

2. The method as defined in claim 1 wherein the layer is formed by reduction of alkaline earth sulfate by reaction with carbon produced by the decomposition of the thermosetting plastic to produce alkaline earth sulfide and carbon dioxide.

3. The method as defined in claim 1 wherein the alkaline earth sulfate is selected from the class consisting of beryllium sulfate, magnesium sulfate, calcium sulfate, strontium sulfate, barium sulfate, radium sulfate and mixtures thereof.

4. The method as defined in claim 1 wherein the thermosetting plastic is selected from the class consisting of phenolic resins, urea formaldehydes, melamine formaldehydes, and which decompose upon the application of heat thereto to provide available carbon.

5. The method for forming a heat barrier including the steps of a. holding a thermosetting plastic of reduced particle size in intimate contact within a shaped matrix of alkaline earth sulfate hydrate,
b. heating the surface of the composition so formed with a reducing flame to an elevated temperature at which the thermosetting plastic decomposes,
c. reacting the carbon produced by the decomposition of the thermosetting plastic at said surface with the sulfate to reduce the sulfate at said surface to a sulfide, and to form an adherent heat barrier coating upon said surface, and
d. using said composition as a heat barrier.

6. The method as defined in claim 5 herein wherein the alkaline earth sulfide formed upon the surface of the composition is formed as a relatively thin coating which acts to disperse heat from said composition and forms a barrier to the transmission of heat into said composition.

7. The method as defined in claim 5 herein wherein the sulfate hydrate employed is derived from the class of beryllium sulfate, magnesium sulfate, calcium sulfate, radium sulfate and mixtures thereof.

8. The method as defined in claim 5 herein wherein the thermosetting plastic used is selected from the class consisting of thermosetting plastics including phenolic resin, urea formaldehydes, and melamine formaldehydes which decompose at elevated temperatures producing carbon which is reactive with the sulfate to reduce the same to the sulfides at elevated temperatures.

9. The method of forming a heat barrier which comprises a. bonding in intimate contact an alkaline earth sulfate with thermosetting plastic of reduced particle size to form a shaped article,
b. applying to the surface of said shaped article a high temperature reducing flame to produce thereon an alkaline earth sulfide coating resistant to the transmission of thermal energy, and
c. using said article as a heat barrier.

10. The method as defined in claim 9 a. wherein the alkaline earth sulfate is calcium sulfate and the thermosetting plastic is a heat decomposable phenolic plastic.

11. The method as defined in claim 9 a. wherein the alkaline earth sulfate and thermosetting plastic are bonded together by the addition of water.

12. The method of forming a heat barrier which comprises a. mixing an alkaline earth sulfate with carbonaceous material comprising a carbon-containing material which will coke or char under the influence of heat to provide available carbon and having a maximum average particle size below about 500 microns,
b. forming the resulting mixture into a shaped material,
c. applying to the surface of the shaped material a high temperature atmosphere to produce thereon a coating of alkaline earth sulfide resistant to the transmission of thermal energy and
d. using said shaped material as a heat barrier.

* * * * *